United States Patent
Kulkarni et al.

(10) Patent No.: US 12,282,992 B2
(45) Date of Patent: Apr. 22, 2025

(54) MACHINE LEARNING BASED CONTROLLABLE ANIMATION OF STILL IMAGES

(71) Applicant: ADOBE INC., San Jose, CA (US)

(72) Inventors: Kuldeep Kulkarni, Bengaluru (IN); Aniruddha Mahapatra, Kolkata (IN)

(73) Assignee: Adobe Inc., San Jose, CA (US)

(*) Notice: Subject to any disclaimer, the term of this patent is extended or adjusted under 35 U.S.C. 154(b) by 243 days.

(21) Appl. No.: 17/856,362

(22) Filed: Jul. 1, 2022

(65) Prior Publication Data

US 2024/0005587 A1 Jan. 4, 2024

(51) Int. Cl.
G06T 13/80 (2011.01)
G06T 3/18 (2024.01)
G06T 7/215 (2017.01)

(52) U.S. Cl.
CPC ............... *G06T 13/80* (2013.01); *G06T 3/18* (2024.01); *G06T 7/215* (2017.01); *G06T 2207/10016* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | | |
|---|---|---|---|---|
| 10,685,472 | B1* | 6/2020 | Rasheed | G06T 11/203 |
| 2006/0244757 | A1* | 11/2006 | Fang | G06T 15/04 |
| | | | | 345/582 |
| 2015/0092856 | A1* | 4/2015 | Mammou | H04N 19/51 |
| | | | | 375/240.16 |
| 2018/0247418 | A1* | 8/2018 | Crivelli | G06T 7/215 |
| 2019/0164322 | A1* | 5/2019 | Kong | G06T 7/11 |
| 2020/0401835 | A1* | 12/2020 | Zhao | G06V 10/426 |
| 2021/0158539 | A1* | 5/2021 | Zhang | G06T 7/207 |
| 2021/0279840 | A1* | 9/2021 | Chi | G06T 3/40 |
| 2021/0390677 | A1* | 12/2021 | Do | G06T 11/60 |
| 2022/0262002 | A1* | 8/2022 | Wang | G06T 7/10 |
| 2022/0301184 | A1* | 9/2022 | Choe | G06T 3/18 |
| 2022/0303495 | A1* | 9/2022 | Choe | G06T 5/50 |
| 2022/0398751 | A1* | 12/2022 | Parashar | G06T 7/269 |

(Continued)

OTHER PUBLICATIONS

Blattmann, A., et al., "iPOKE: Poking a Still Image for Controlled Stochastic Video Synthesis", In Proceedings of the IEEE/CVF International Conference on Computer Vision, pp. 14707-14717 (2021).

(Continued)

*Primary Examiner* — Anh-Tuan V Nguyen
(74) *Attorney, Agent, or Firm* — Shook, Hardy & Bacon L.L.P.

(57) ABSTRACT

Systems and methods for machine learning based controllable animation of still images is provided. In one embodiment, a still image including a fluid element is obtained. Using a flow refinement machine learning model, a refined dense optical flow is generated for the still image based on a selection mask that includes the fluid element and a dense optical flow generated from a motion hint that indicates a direction of animation. The refined dense optical flow indicates a pattern of apparent motion for the at least one fluid element. Thereafter, a plurality of video frames is generated by projecting a plurality of pixels of the still image using the refined dense optical flow.

20 Claims, 12 Drawing Sheets

(56) References Cited

U.S. PATENT DOCUMENTS

| | | | |
|---|---|---|---|
| 2023/0187052 A1* | 6/2023 | Chen | G16H 50/30 382/268 |
| 2023/0281830 A1* | 9/2023 | Zhang | G06T 3/4069 382/173 |
| 2024/0249523 A1* | 7/2024 | Cole | G06T 7/194 |

OTHER PUBLICATIONS

Blattmann, A., et al., "Understanding Object Dynamics for Interactive Image-to-Video Synthesis", In Proceedings of the IEEE/CVF Conference on Computer Vision and Pattern Recognition, pp. 5171-5181 (2021).
Caballero, J., et al., "Real-Time Video Super-Resolution with Spatio-Temporal Networks and Motion Compensation", In IEEE Conference on Computer Vision and Pattern Recognition, pp. 4778-4787 (2017).
Castrejon, L., et al., "Improved Conditional VRNNs for Video Prediction", In Proceedings of the IEEE/CVF International Conference on Computer Vision, pp. 7608-7617 (2019).
Chuang, Y., Y., et al., "Animating Pictures with Stochastic Motion Textures", In ACM SIGGRAPH 2005 Papers, pp. 853-860 (2005).
Dorkenwald, M., et al., "Stochastic Image-to-Video Synthesis using cINNs", In Proceedings of the IEEE/CVF Conference on Computer Vision and Pattern Recognition, pp. 3742-3753 (2021).
Endo, Y., et al., "Animating Landscape: Self-Supervised Learning of Decoupled Motion and Appearance for Single-Image Video Synthesis", ACM Transactions on Graphics (Proceedings of ACM SIGGRAPH Asia), vol. 38, No. 6, Article, 175, pp. 175:1-175:19 (Nov. 2019).
Franceschi, J., Y., et al., "Stochastic Latent Residual Video Prediction", In Proceedings of the 37th International Conference on Machine Learning, PMLR, pp. 3233-3246 (2020).
Goodfellow, I., J., et al., "Generative Adversarial Nets", Advances in neural information processing systems, pp. 1-9 (Jun. 10, 2014).
Hadji, I., and Wildes, R., P., "A New Large Scale Dynamic Texture Dataset with Application to ConvNet Understanding", In Proceedings of the European Conference on Computer Vision (ECCV), pp. 320-335 (2018).
Halperin, T., et al., "Endless Loops: Detecting and Animating Periodic Patterns in Still Images", ACM Transactions on Graphics, vol. 40, No. 4, Article. 142, pp. 1-12 (Aug. 2021).
Hao, Z., et al., "Controllable Video Generation with Sparse Trajectories", In Proceedings of the IEEE Conference on Computer Vision and Pattern Recognition, pp. 7854-7863 (Jun. 18-23, 2018).
Holynski, A., et al., "Animating Pictures with Eulerian Motion Fields", In Proceedings of the IEEE Conference on Computer Vision and Pattern Recognition (CVPR), pp. 2364-2373 (2021).
Holynski, A., et al., "Animating Pictures with Eulerian Motion Fields", In Proceedings of the IEEE/CVF Conference on Computer Vision and Pattern Recognition, CVPR, pp. 5810-5819 (Jun. 2021).
Karras, T., et al., "Analyzing and Improving the Image Quality of StyleGAN", In Proceedings of the IEEE/CVF Conference on Computer Vision and Pattern Recognition, pp. 8110-8119 (Mar. 23, 2020).
Kay, W., et al. "The Kinetics Human Action Video Dataset", Computer Vision and Pattern Recognition, arXiv:1705.06950v1, pp. 1-22 (May 19, 2017).
Li, Y., et al., "Flow-Grounded Spatial-Temporal Video Prediction from Still Images", In Proceedings of the European Conference on Computer Vision, ECCV, pp. 600-615 (2018).
Logacheva, E., et al., "Deeplandscape: Adversarial Modeling of Landscape Videos", In European Conference on Computer Vision, Springer, pp. 256-272 (2020).
Mahapatra, A., and Kulkarni, K., "Controllable Animation of Fluid Elements in Still Images", Computer Vision and Pattern Recognition, arXiv:2112.03051, pp. 1-12 (Dec. 6, 2021).
Minderer, M., et al., "Unsupervised Learning of Object Structure and Dynamics from Videos", 33rd Conference on Neural Information Processing Systems (NeurIPS), pp. 1-20 (Nov. 12, 2019).
Niklaus, S., and Liu, F., "Softmax Splatting for Video Frame Interpolation", In IEEE Conference on Computer Vision and Pattern Recognition, pp. 5437-5446 (2020).
Pan, J., et al., "Video Generation from Single Semantic Label Map", In Proceedings of the IEEE/CVF Conference on Computer Vision and Pattern Recognition, pp. 3733-3742 (2019).
Park, T., et al., "Semantic Image Synthesis With Spatially-Adaptive Normalization", In Proceedings of the IEEE Conference on Computer Vision and Pattern Recognition, pp. 2337-2346 (2019).
Reda, F., A., et al., "SDC-Net: Video prediction using spatially-displaced convolution", In Proceedings of the European Conference on Computer Vision (ECCV), pp. 718-733 (2018).
Ronneberger, O., et al., "U-Net: Convolutional Networks for Biomedical Image Segmentation", In International Conference on Medical image computing and computer-assisted intervention, Springer, pp. 234-241 (2015).
Simonyan, K., and Zisserman, A., "Very Deep Convolutional Networks for Large-Scale Image Recognition", ICLR, pp. 1-13 (Dec. 13, 2014).
Szegedy, C., et al., "Rethinking the Inception Architecture for Computer Vision", In Proceedings of the IEEE conference on computer vision and pattern recognition, pp. 2818-2826 (2016).
Tian, Y., et al., "A Good Image Generator is What You Need for High-Resolution Video Synthesis", In Proceedings of the International Conference on Learning Representations, ICLR, pp. 1-23 (2021).
Unterthiner, T., et al., "Towards Accurate Generative Models of Video: A New Metric & Challenges", Computer Vision and Pattern Recognition, arXiv:1812.01717, pp. 1-17 (2018).
Villegas, R., et al., "Decomposing Motion and Content for Natural Video Sequence Prediction", ICLR, arXiv:1706.08033, pp. 1-22 (2017).
Villegas, R., et al., "High Fidelity Video Prediction with Large Stochastic Recurrent Neural Networks", 33rd Conference on Neural Information Processing Systems (NeurIPS), pp. 81-91 (2019).
Wang, T., C., et al., "Few-shot Video-to-Video Synthesis", arXiv:1910. 12713, pp. 1-14 (2019).
Wang, T., C., et al., "Video-to-Video Synthesis", arXiv: 1808. 06601, pp. 1-14 (2018).
Wu, Y., et al., "Future Video Synthesis with Object Motion Prediction", In Proceedings of the IEEE/CVF Conference on Computer Vision and Pattern Recognition, pp. 5539-5548 (2020).
Xiong, W., et al., "Learning to Generate Time-Lapse Videos Using Multi-Stage Dynamic Generative Adversarial Networks", In Proceedings of the IEEE Conference on Computer Vision and Pattern Recognition, pp. 2364-2373 (2018).
Zhang, J., et al., "DTVNet: Dynamic Time-lapse Video Generation via Single Still Image", In European Conference on Computer Vision, pp. 300-315 (2020).

* cited by examiner

MACHINE LEARNING BASED CONTROLLABLE ANIMATION OF STILL IMAGES

BACKGROUND

Digital content is increasingly incorporating the use of animated components to, among other reasons, attract viewer attention, convey information, and/or establish an atmosphere or context. For example, digital signage that includes animated components are more likely to attract viewer engagement than those based on other modalities, such as static images. That said, acquiring animations or videos specifically relevant to content is more challenging than acquiring still images. Photo animation software that includes moving picture effects are an example of tools that content creators can use to add motion of varying types and degrees to either the foreground or background of still images. In some cases, for example, the user uploads a still image to a cloud-based image animation service and receives in return from the service a video file having one or more animated elements. The content creators can then embed the video file in their content for display on a website, digital signage, or similar displays.

SUMMARY

The present disclosure is directed, in part, to improved systems and methods for machine learning based controllable animation of still images, substantially as shown and/or described in connection with at least one of the figures, and as set forth more completely in the claims.

Embodiments presented in this disclosure provide for, among other things, a fluid animation function for an image editing application that generates an animated video from a single still image. The fluid animation function animates fluid elements of an input still image (that is, elements of the captured scene that have motion such as water, smoke, fire and/or cloudy sky elements, for example) and generates an output video where those fluid elements are realistically animated. The fluid animation function includes a machine learning model trained to generate a refined dense optical flow from a still image, given a selected mask (e.g., a user selected mask) indicating the elements to be animated, and motion hints indicating a direction and speed of animation flow. The refined dense optical flow generally refers to a machine language model generated optical flow map for the still image that indicates a pattern of apparent motion for fluid elements of the still image that are within the selected mask. The machine learning model is trained to recognize fluid elements in natural scenes so that the refined dense optical flow is a more realistic optical flow than the intermediary dense optical flow computed from sparse motion hints. In some embodiments, to generate each frame of video from the still image, the refined dense optical flow is integrated in both forward and reverse directions to produce a set of flow field pairs (e.g., Eularian or Lagrangian flow fields), each pair comprising a forward flow field and a reverse flow field. A video frame generation pipeline comprising an encoder-decoder machine learning model then processes the still image using the flow field pairs to apply forward and reverse deep feature warping and symmetric splatting to generate a plurality video image frames.

BRIEF DESCRIPTION OF THE DRAWINGS

The embodiments presented in this disclosure are described in detail below with reference to the attached drawing figures, wherein.

DETAILED DESCRIPTION

Figure 1:
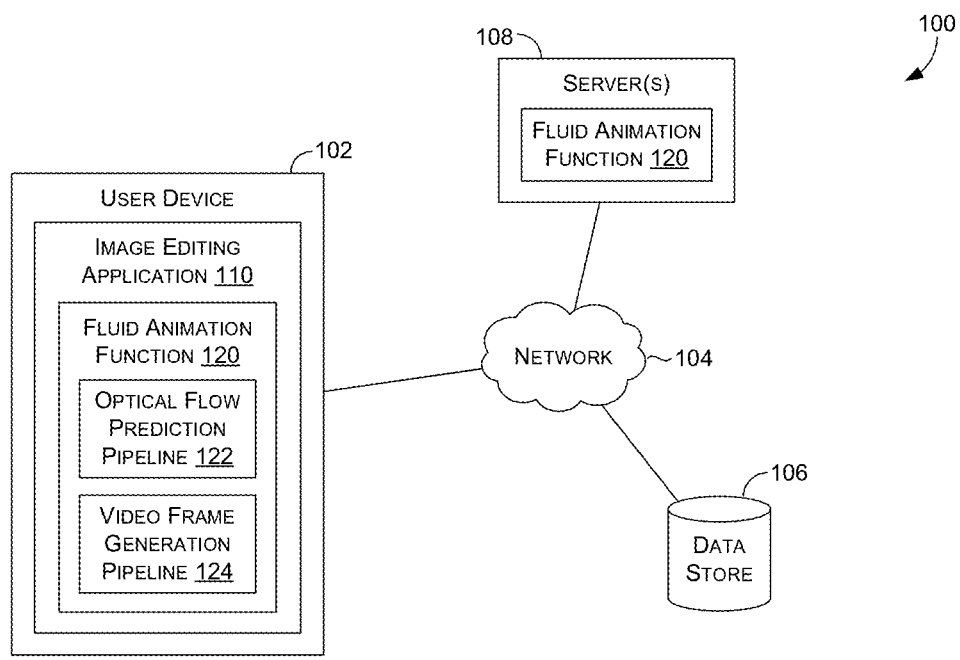
FIG. 1 is a block diagram illustrating an operating environment, in accordance with embodiments of the present disclosure.

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments can be utilized and that logical, mechanical and electrical changes can be made without departing from the scope of the present disclosure. The following detailed description is, therefore, not to be taken in a limiting sense. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

Digital content is increasingly incorporating the use of animated components to, among other reasons, attract viewer attention, convey information, and/or establish an atmosphere or context. Video-based content is often more engaging and more likely to gain viewer trust than content based on other modalities, such as static still images. However, acquiring relevant animated content is substantially more challenging than acquiring still images.

Existing state-of-the-art methods for converting a single still image to video are limited in that they produce an extremely short sequence of low-resolution video, produce cross-fading artifacts, and/or do not give users control over the generated video. Generative Adversarial Networks (GANs) have been used to attempt to predict an entire video at once using video-based generators. However, these approaches have been inflexible to the number of output frames that are generated. The quality of the generated videos is also very low in terms of resolution (e.g., 128×128) and they generate a very short sequence of frames (e.g., 5-10 frames). Flow warping approaches are also proposed that predict a sequence of optical flows from the input image, but the quality of videos produced degrades severely after just a few frames due to error propagation as at each time-step because the predicted optical flow is dependent on, and thus propagates errors from, the previous generated frames. Other approaches that provide a greater degree of user control rely on the use of separate sets of user supplied sparse trajectories for each frame of video to be generated to obtain a dense optical flow map for each frame.

The embodiments described herein have the practical advantage over existing technologies in that they have the ability to generate, from a single still image, an unlimited number of video frames having the same resolution as the still image, where the animation is based on just a few sparse motion hints applied to the input still image. In some embodiments, an image editing application includes a fluid animation function that includes a machine learning model trained to recognize fluid elements from an image (that is, elements of a captured scene that have motion such as water, smoke, fire and/or cloudy sky elements, for example). The machine learning model is further trained to generate a refined dense optical flow from a still image, given a selected mask (e.g., a user selected mask) indicating the elements to be animated, and a sparse set of motion hints that indicate on the still image a direction and speed of animation flow. Such an image editing application may be implemented locally on a user device, as a cloud based service, or using a combination of local and cloud based software components.

The sparse set of motion hints, by themselves, may be inadequate to predict an accurate flow from the machine learning model. The sparse set of motion hints are therefore used by the fluid animation function to compute an intermediary dense optical flow (which may be computed, for example, using simple exponential functions as discussed in greater detail below). The intermediary dense optical flow is applied to the machine learning model (with the mask and input still image) to generate the refined dense optical flow. The resulting refined dense optical flow is an optical flow map for the still image that indicates a pattern of apparent motion for the fluid elements of the still image that are within the selected mask. In order to produce each of the separate fames of the video, Eularian integration (or a similar integration algorithm such as a Lagrangian algorithm) is iteratively performed on the refined dense optical flow. For each frame, the integration is performed both in the forward and reverse (backwards) directions to produce a set of flow field pairs. As discussed in further detail below with respect to FIG. 4, each flow field pair includes a forward Euler flow field and a reverse Euler flow field (or alternately a forward Lagrangian flow field and a reverse Lagrangian flow field, when a Lagrangian integration algorithm is used instead of a Eularian integration algorithm). For each frame of video to be produced, a flow field pair is used to project pixels from the still image to computed positions within the video frame, producing the effect of animated flow as the pixel appears to move when the resulting video frames are displayed as a video sequence. In some embodiments, each video frame of the video sequence is generated using an encoder-decoder machine learning model to processes the input still image using a flow field pairs to apply forward deep feature warping (using the forward flow field of the pair) and reverse deep feature warping (using the reverse flow field of the pair), and then applying symmetric splatting, as further discussed herein.

In some embodiments, the process for predicting the optical flows (the refined dense optical flow and flow field pairs) is performed via a separate pipeline from the process for generating video frames. In such embodiments, the fluid animation function thus includes an optical flow prediction pipeline and a video frame generation pipeline. The optical flow prediction pipeline comprises the flow refinement machine learning model that generates the refined dense optical flow and the set of flow field pairs. In some embodiments, the video frame generation pipeline comprises a multi-scale encoder-decoder video generation machine learning model that receives the input still image and the set of flow field pairs from the optical flow prediction pipeline, and applies deep feature warping and symmetric splatting to generate each of the frames for the animated video.

As further discussed herein, the embodiments presented by this disclosure have distinct practical advantages over existing technologies. For example, computing resources consumed while waiting on user interactions (e.g., the mask and motion hints) are minimized because such interactions are obtained at the onset of the process based on interactions with the initial still image. The remaining process is performed from that point without a need to spend further computing cycles waiting to receive user inputs at subsequent steps. Moreover, the computation of the set of flow field pairs from the refined dense optical flow means that the flow refinement machine learning model need only be executed one time to compute the refined dense optical flow, regardless of the number of video image frames to be produced. The number of frames produced is instead a function of the number of times the refined dense optical flow is integrated, which is computationally less intensive than having to iteratively execute the machine learning model to produce a flow field for each video frame. Further, because of the realism of the resulting animated video, computing resources are more efficiently utilized as fewer trial-and-error iterations by the user are needed to arrive at an acceptable animated video product. Additional features of the embodiments described herein are that the user may, through the motion hints, specify arbitrary directions for animation that may not correspond to motions in the training data used to train the machine learning models. For example, the user may specify motion hints to produce a waterfall that is animated to flow upwards, or even sideways. Moreover, the flow refinement machine learning model approach is advantageous over prior approaches as the model is trained to recognizing flowing image elements and therefore can generate a refined dense optical flow that distinguished between fluid object boundaries (such as between a lake and waterfall spilling into the lake).

Turning to FIG. 1, FIG. 1 depicts an example configuration of an operating environment 100 in which some implementations of the present disclosure can be employed. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether for the sake of clarity. Further, many of the elements described herein are functional entities that can be implemented as discrete or distributed components or in conjunction with other components, and in any suitable combination and location. Various functions described herein as being performed by one or more entities are be carried out by hardware, firmware, and/or software. For instance, in some embodiments, some functions are carried out by a processor executing instructions stored in memory as further described with reference to FIG. 8, or within a cloud computing environment as further described with respect to FIG. 9.

It should be understood that operating environment 100 shown in FIG. 1 is an example of one suitable operating environment. Among other components not shown, operating environment 100 includes a user device, such as user device 102, network 104, a data store 106, and one or more servers 108. Each of the components shown in FIG. 1 can be implemented via any type of computing device, such as one or more of computing device 800 described in connection to FIG. 8, or within a cloud computing environment 900 as further described with respect to FIG. 9, for example. These components communicate with each other via network 104, which can be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) to provide wireless connectivity. Networking environments are commonplace in offices, enterprise-wide computer networks, intranets, and the Internet. Accordingly, network 104 is not described in significant detail.

It should be understood that any number of user devices, servers, and other components are employed within operating environment 100 within the scope of the present disclosure. Each component comprises a single device or multiple devices cooperating in a distributed environment.

User device 102 can be any type of computing device capable of being operated by a user. For example, in some implementations, user device 102 is the type of computing device described in relation to FIG. 8. By way of example and not limitation, a user device is embodied as a personal computer (PC), a laptop computer, a mobile device, a smartphone, a tablet computer, a smart watch, a wearable computer, a headset, an augmented reality device, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user device 102 can include one or more processors, and one or more computer-readable media. The computer-readable media includes computer-readable instructions executable by the one or more processors. The instructions are embodied by one or more applications, such as image editing application 110 shown in FIG. 1. Image editing application 110 is referred to as a single application for simplicity, but its functionality can be embodied by one or more applications in practice. As indicated above, the other user devices can include one or more applications similar to image editing application 110.

The image editing application 110 can generally be any application capable of facilitating the still image animation techniques described herein, either on its own, or via an exchange of information between the user device 102 and the server 108. In some implementations, the image editing application 110 comprises a web application, which can run in a web browser, and could be hosted at least partially on the server-side of environment 100. In addition, or instead, the image editing application 110 can comprise a dedicated application, such as any application having document display functionality. An image editing application generally refers to any application that facilitates image editing. Examples of various image editing include but are not limited to, Adobe® Photoshop, Adobe® Photoshop Elements, Adobe® Premier Elements, or any application providing image editing functionality. In some cases, one or more aspects of the image editing application 110 is integrated into the operating system of user device 102 (e.g., as a service). It is therefore contemplated herein that "application" be interpreted broadly.

In some embodiments, an input still image to be animated is obtained from a memory of the user device 102, or is obtained from other sources. For example, in some embodiments, the input still image is obtained from a memory of the user device 102, received from a data store 106, or obtained from server 108.

In some embodiments, the image editing application 110 operates in conjunction with a fluid animation function 120. The fluid animation function 120 processes the initial still photo into a multi-frame animated video that may be saved as a file onto user device 102, server 108 and/or data store 106, and/or embedded into documents for display via the user device 102 or other user devices. The functionality of the user device 102, server(s) 108, and/or other system implementing the fluid animation function 120, is therefore enhanced in that it is able to facilitate transformation of a single still image into user customized animated video.

In some embodiments, the fluid animation function 120 comprises an optical flow prediction pipeline 122 and a video frame generation pipeline 124. As explained in greater detail herein, the optical flow prediction pipeline comprises a flow refinement machine learning model that generates a refined dense optical flow. The refined dense optical flow generated by the flow refinement machine learning model is an optical flow map for the still image. That is, the refined dense optical flow is an optical flow map in that indicates a pattern of apparent motion for fluid elements of the still image that are within a mask (e.g., a user selected mask). The refined dense optical flow is generated from an input still image, a fluid element selection mask that identifies the fluid elements to be animated, and motion hints (e.g., user-supplied motion hints).

In some embodiments, the image editing application 110 displays the input still image onto a display of the user device 102 and computes the fluid element selection mask based on user interactions with the input still image. For example, a mask is a standard tool used in image editing and processing that is used to indicate a section or region of an image to which a selected filter or other algorithm should apply. Animation would thus be applied to fluid elements appearing within the section or region of the still image selected via the fluid element selection mask. In the same way, the motion hints can be derived by the image editing application 110 based on user interactions within the portion of the input still image within the fluid element selection mask. In some embodiments, the application 110 also receives, based on user input, speed values corresponding to motion hints, and an indication from the user of the number, N, of frames of animated video to be generated. The optical flow prediction pipeline 122 processes the refined dense optical flow to compute a set of flow fields that includes a flow field pair for each of the N frames of animated video to be generated. In other words, the motion hints, selection mask and input still image are used to derive the refined dense optical flow. The value of N indicates the number of video frames to be produced from the refined dense optical flow. One pair of flow fields, each comprising a forward flow field and a reverse flow field, is generated for each of the N frames of video to be produced from the still image. Each pair of flow fields indicate how pixels of the still image are displaced and projected into the frame of video associated with that pair of flow fields. In some embodiments, the flow field pairs each comprise a pair of Eularian flow fields. In other embodiments, the flow field pairs may instead each comprise a pair of Lagrangian flow fields.

In some embodiments, the video frame generation pipeline 124 comprises a multi-scale encoder-decoder video generation machine learning model that receives the input still image, and the N sets of flow fields from the optical flow prediction pipeline. Using the flow field pairs, the video frame generation pipeline 124 applies deep feature warping and symmetric splatting to the still image (as detailed below) to generate each of the N frames of animated video. In some embodiments, one or more aspects of the application 110 and/or the fluid animation function 120 are executed at least in part by server(s) 108. The application 110, in some embodiments, provides an interactive user interface on the user device 102 that allows the user to select and adjust the fluid element selection mask, the motion hints and corresponding animation speeds, and the number of frames of animated video to be generated. Such a user interface is discussed below in more detail with respect to FIGS. 3A. 3B and 3C. It should be noted that the functions described herein in relation to the fluid animation function 120 can be performed at the user device 101 and/or server 108. As one example, user interface interactions may be provided by a user via the user device 102 while aspects of the optical flow prediction pipeline 122 and/or video frame generation pipeline 124 are performed on the server 108.

Figure 2:
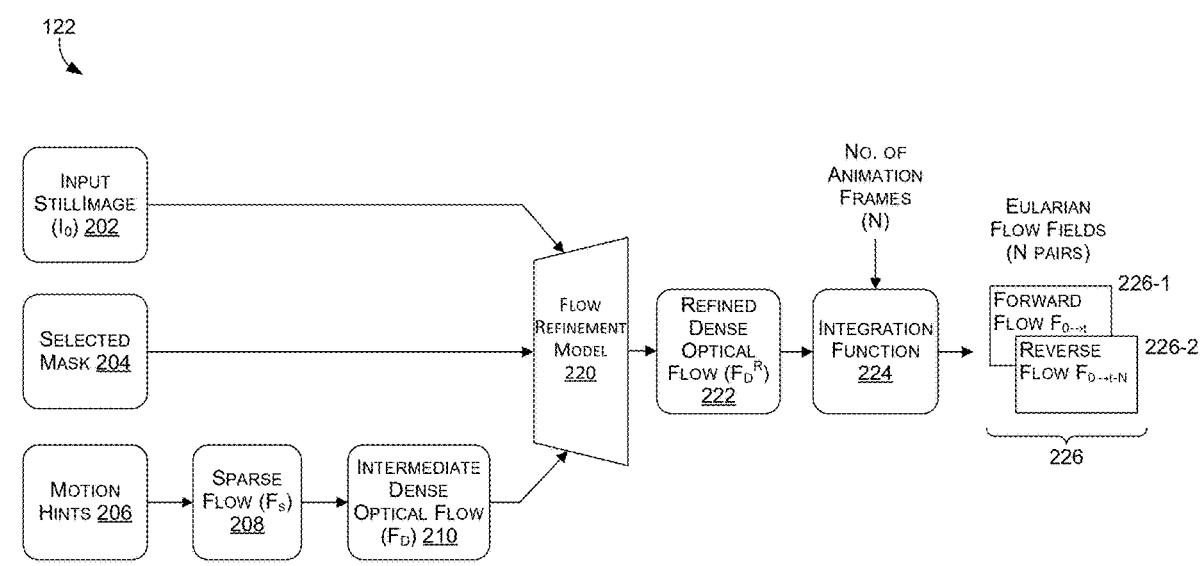
FIG. 2 is a block diagram illustrating an example optical flow prediction pipeline, in accordance with embodiments of the present disclosure.

FIG. 2 is a diagram illustrating an example of an optical flow prediction pipeline 122 for example, as embodied in image editing application 110. The optical flow prediction pipeline 122 can be executed at least in part by user device 102 and or server(s) 108 to realize the functionality described herein. In this embodiment, the optical flow prediction pipeline 122 comprises a flow refinement machine learning model 220 and an integration function 224 (such as a Euler or Lagrangian integration function).

The optical flow prediction pipeline 122 receives as input the input still image ($I_0$) 202, fluid element selection mask 204, and motion hints 206. The fluid element selection mask 204 indicates the regions of the input still image 202 that include fluid elements that the fluid animation module 120 will animate. The motion hints 206 can comprise arrows, lines, or other indicators, entered by the user, for example using arrow, line, or freehand drawing tools provided by the image editing application 110.

Figure 3A:
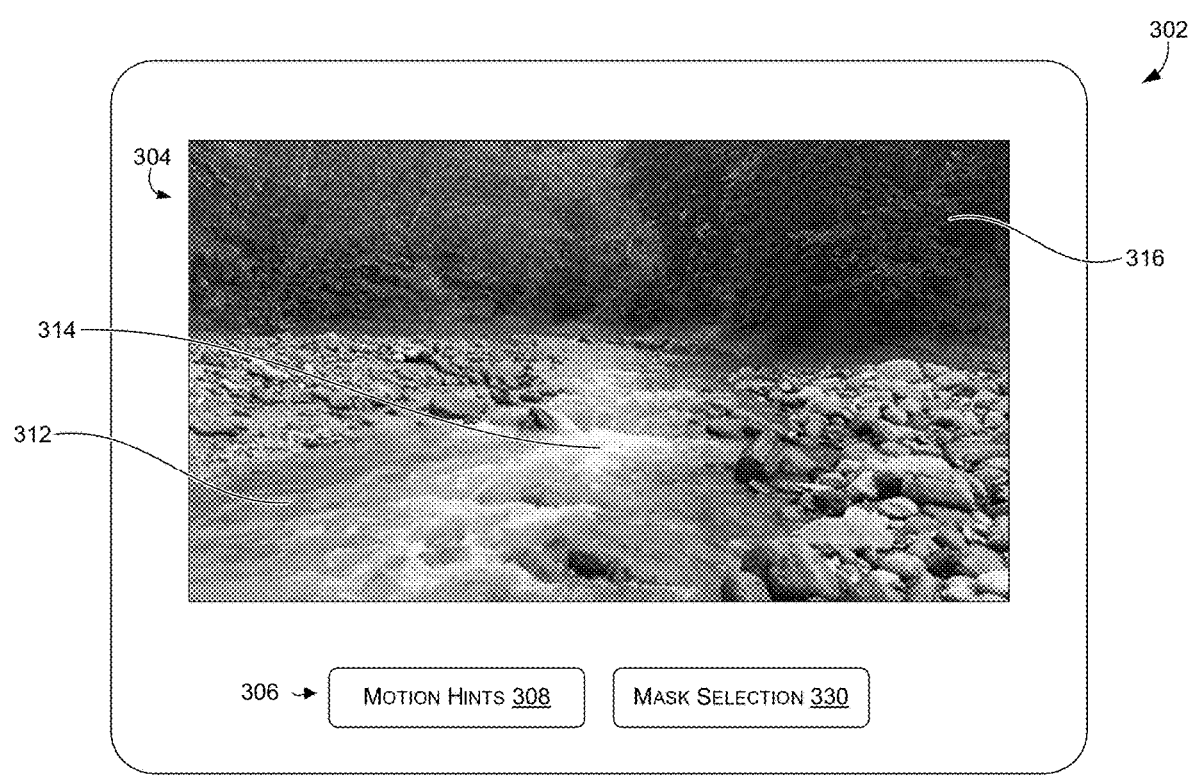
FIGS. 3A, 3B and 3C are diagrams illustrating example user interfaces, in accordance with embodiments of the present disclosure.

For example, FIG. 3A illustrates a user interface 302 generated by the image editing application 110 for display on the user device 102. As shown in FIG. 3A, user interface 302 includes a display 304 of the input still image 202. In this example, the still image 202 is a scene comprising a flowing stream 312 that includes a set of rapids 314, where the stream 312 is flowing through a wooded environment 316. The user interface 302 also includes at least one set of user controls 306.

Figure 3B:
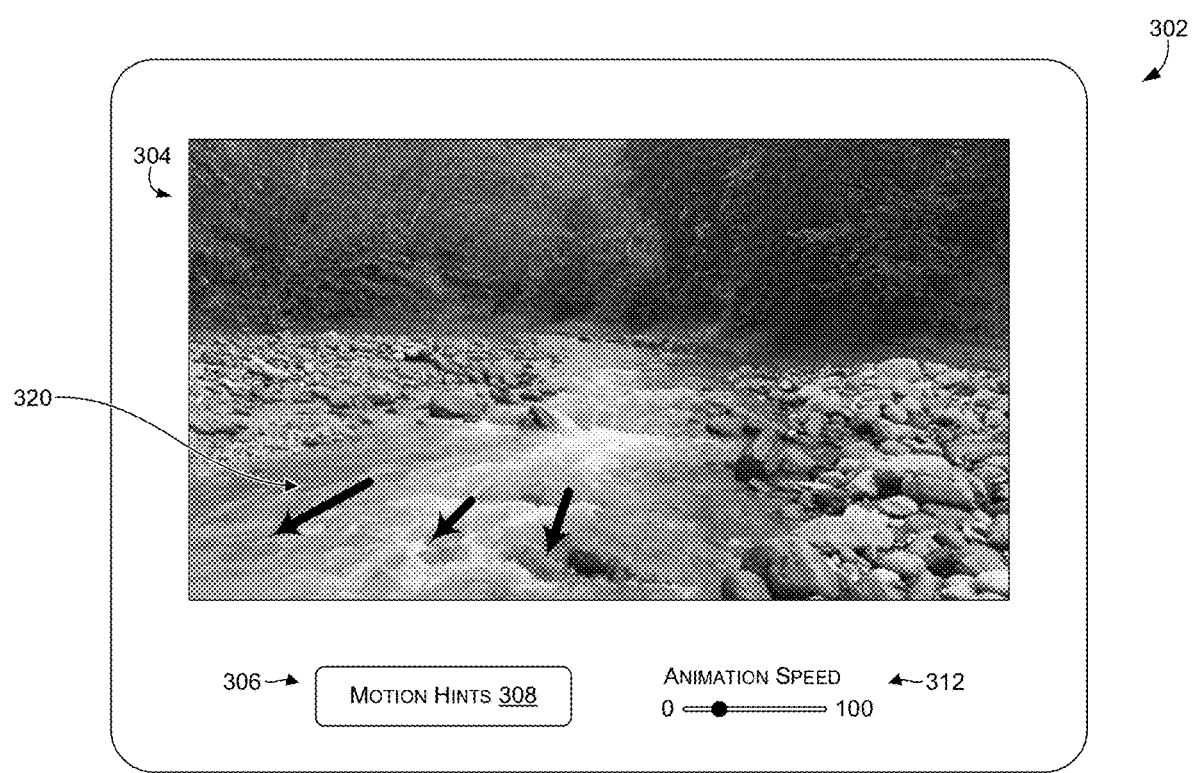

To enter motion hints, a user can select the motion hints button 308. When the user selects the motion hints button 308, the user interface 302 switches to a user interaction mode for entering motion hints as shown in FIG. 3B. While in the user interaction mode for entering motion hints, the user may draw a set of one or more motion hints 320 (such as lines or arrows, for example) that indicate a desired direction of fluid motions to apply for that part of the still image. For example, where user interface 302 is provided on a touch screen, the user can draw the motion hints 320 using a finger or stylus. In other embodiments, the user can use a pointing device such as a mouse or trackpad to draw the motion hints 320. In some embodiments, the user interface 302 also provides at least one animation speed input 312 for the user to enter a desired speed of animation to be applied to fluid elements. In some embodiments, a desired speed of animation can be entered by the user for each respective motion hint 320. In the embodiment shown in FIG. 3B, the animation speed input 312 is shown in the form of a slider that the user can manipulate to indicate animation speed. In other embodiments, other types of user input controls can be used.

Figure 3C:
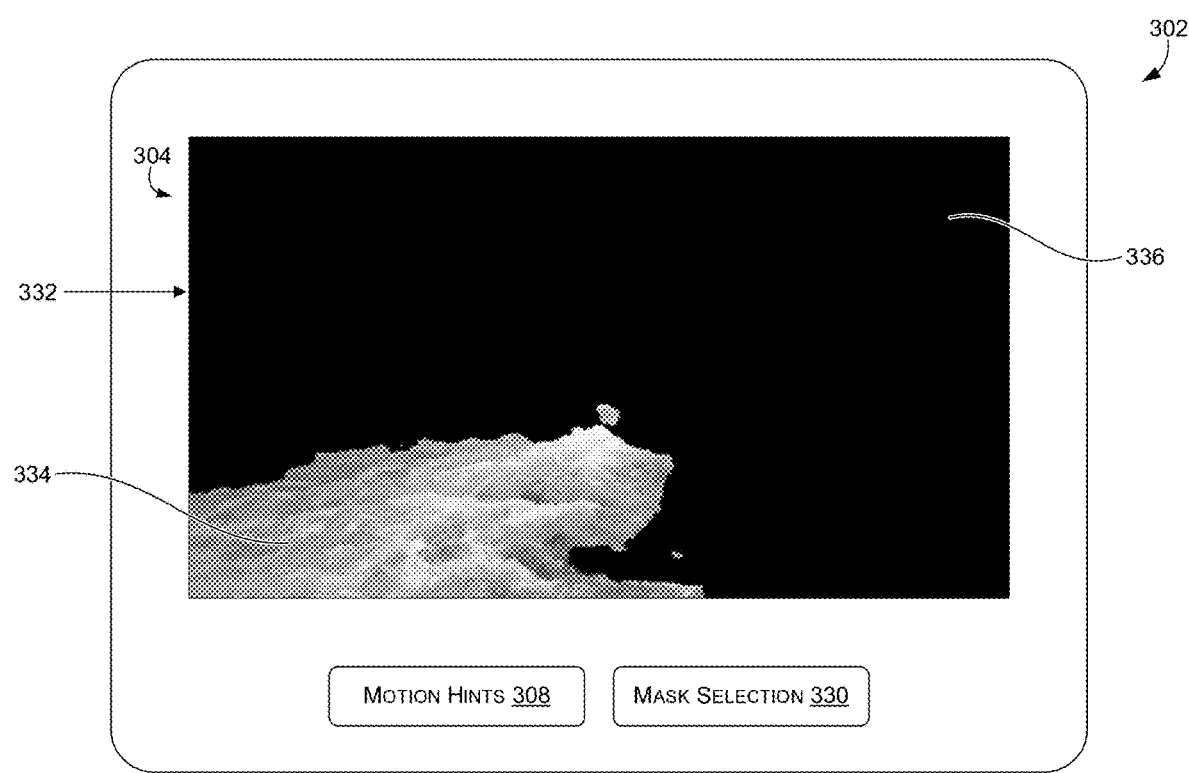

Referring back to FIG. 3A, to select a fluid element selection mask, the user may select mask selection button 330. When the user selects the mask selection button 330, the user interface 302 switches to a mask selection mode as shown in FIG. 3C. While the user interface 302 is in the mask selection mode, the user may apply one or more mask selection tools to the still image 202 as displayed on the display 304 to define the fluid element selection mask 332. The fluid element selection mask 332 indicates the regions of the still image 202 where fluid elements will be animated (e.g., such as shown at 334) verses regions of the still image that will not be animated (e.g., such as shown at 336).

Returning again to FIG. 2, in some embodiments, user motion hints 206 (e.g., the motion hints 320 drawn onto the image 202 via user interface 302) are converted to a sparse input flow map, $F_S$, as shown at 208. More specifically, the optical flow prediction pipeline 122 converts the directions of motion hints (which may be referred to as $A^{1\cdots,K}$), and the corresponding speed inputs (which may be referred to as $S^{1\cdots,K}$), into the sparse optical flow map $F_S$ (shown at 208). For each user motion hint, $A^n$ (where $n \in [0,K]$) at a location i in the image) defines a start location (i) and an end (j) location, where respective starting and ending coordinates expressed as ($x^i$, $y^i$) and ($x^j$, $y^j$). Given $A^n$, the sparse input flow $F_S$ can be expressed and computed by the optical flow prediction pipeline 122 using the expression:

$$Fs(x^i, y^i) = \begin{cases} (x^j, y^j) * S^n & \text{if } A^n \text{ starts at } (x^i, y^i) \\ 0 & \text{otherwise} \end{cases}$$

As mentioned above, the sparse optical flow map, $F_S$, may not itself provide adequate information for the machine learning model 220 to generate realistic optical dense flows for use in producing an animated video. The sparse input flow, $F_S$, is therefore first converted by the optical flow prediction pipeline 122 to an intermediary dense optical flow, $F_D$, (shown at 210) which comprises a dense flow map having the same pixel dimensions as the original input still image 202. That is, each pixel of the intermediary dense optical flow 210 correlates to a pixel of the input still image 202.

In some embodiments, the intermediary dense optical flow 210 is computed from the sparse input flow 208 as a function of distances between each pixel location of still image 202 and the positons of the user motion hints 206. In some embodiments, to compute the intermediary dense optical flow 210, flow prediction pipeline 122 computes an L2 Euclidean distance, $D_{exp}$, between each pixel location in the input still image 202 and the starting coordinate of each of the motion hints 206. The exponential of the L2 Euclidean distance can then be computed by the optical flow prediction pipeline 122 between location $(x^i, y^i)$ of the input still image 202 and the starting position of each motion hint $A^j$, $(x^j, y^j)$, based on a function that can be expressed as:

$$D_{L2}^{i,j} = \|(x^i, y^i) - (x^j, y^j)\|_2$$

$$D_{exp}^{i,j} = e^{-\left(\frac{D_{L2}^{i,j}}{\sigma}\right)^2}$$

where $D_{L2}^{i,j}$ is the Euclidean distance between location $(x^i, y^i)$ of the input still image 202 and the starting position of a motion hint $A^j$, $(x^j, y^j)$, and a is a constant. The dense optical flow for any particular pixel location, i, of the intermediary dense optical flow, $F_D$, 210 can accordingly be computed by the optical flow prediction pipeline 122 as a weighted average of flow magnitude at each non-zero location in the selected mask (M) 204, where the weights are taken from $D_{exp}^{i,j}$. The intermediary dense optical flow, $F_D$, 210 can therefore be computed as:

$$F_D(i) = \begin{cases} \sum_{j=1}^{K} \frac{D_{exp}^{i,j} * F_s(i)}{\sum_{j=1}^{N} D_{exp}^{i,j}} & \text{if } i \in M \\ 0 & \text{if } i \notin M \end{cases}$$

where K is the number of motion hints 206 introduced by the user. The resulting intermediary dense optical flow, $F_D$, 210 describes a motion of fluid elements of the still image 202, with the motion having a flow in approximately in the same direction across still image 202. However, the intermediary dense optical flow 210 is generated as a function of Euclidean distance based on the closeness of a particular pixel location to one or more motion hint points, and for that reason does not distinguish between object boundaries in the still image 202. That is, the intermediary dense optical flow, $F_D$, tends to naively mix flow values between regions of different fluid elements. For example, in a given intermediary dense optical flow, $F_D$, different flow values may be inappropriately computed for different regions of a same waterfall, which will produce an unrealistic animation. Accordingly, in embodiments, the intermediary dense optical flow, $F_D$, 210 is further refined using a flow refinement machine learning model 220 to generate the refined dense optical flow, $F_D^R$, (shown at 222). In some embodiments, the flow refinement machine learning model 220 is implemented, for example, using a SPatially ADaptivE Normalization (SPADE) network. In other embodiments, other neural network architectures may be used.

The refined dense optical flow 222 produced by the flow refinement machine learning model 220 comprises a dense optical flow map (which also has the same pixel dimensions as the original input still image) that indicates a pattern of apparent motion for fluid elements of the still image 202 that are within the selected mask 204. The flow refinement machine learning model 220 is trained to receive as input the input still image 202, the selected mask 204, and the intermediary dense optical flow, $F_D$, 210 as cues, and from those inputs generate the refined dense optical flow, $F_D^R$ 222.

Given the refined dense optical flow, $F_D$ 222, flow field pairs 226 are determined that describe the relative relocation or displacement of pixel from the still image 202. That is, each flow field pair 226 corresponds to a given frame, n, of animated video and indicates where a pixel originally found in the still image 202 has moved to in frame n. Moreover, each flow field of a flow field pair comprises a constant and time-invariant optical flow field, $M_F$, that describes the motion of pixel locations to accurately approximate the complex motion of fluid elements in order to generate a realistic video. For a given pixel location i, an optical flow field Ft→t+1 between consecutive frames in a video at any time t can be given by:

$$Ft{\rightarrow}t+1(i) = M_F(i)$$

Correspondingly, a forward optical flow between a first frame and any subsequent frame at any time t, can be obtained by Euler integration of $M_F$, t times as given by:

$$F_{0{\rightarrow}t}(i) = F_{0{\rightarrow}t-1}(i) + M_F(i + F_{0{\rightarrow}t-1}(i))$$

where $F_{0{\rightarrow}1} = M_F$. In the same manner, a reverse optical flow between a final frame and any prior frame at any time t, can be obtained by Euler integration of $-M_F$, t times. From the refined dense optical flow, $F_D^R$ 222, the optical flow prediction pipeline 112 estimates both forward and reverse flow fields to each frame for $t \in [0, N]$.

Figure 4:
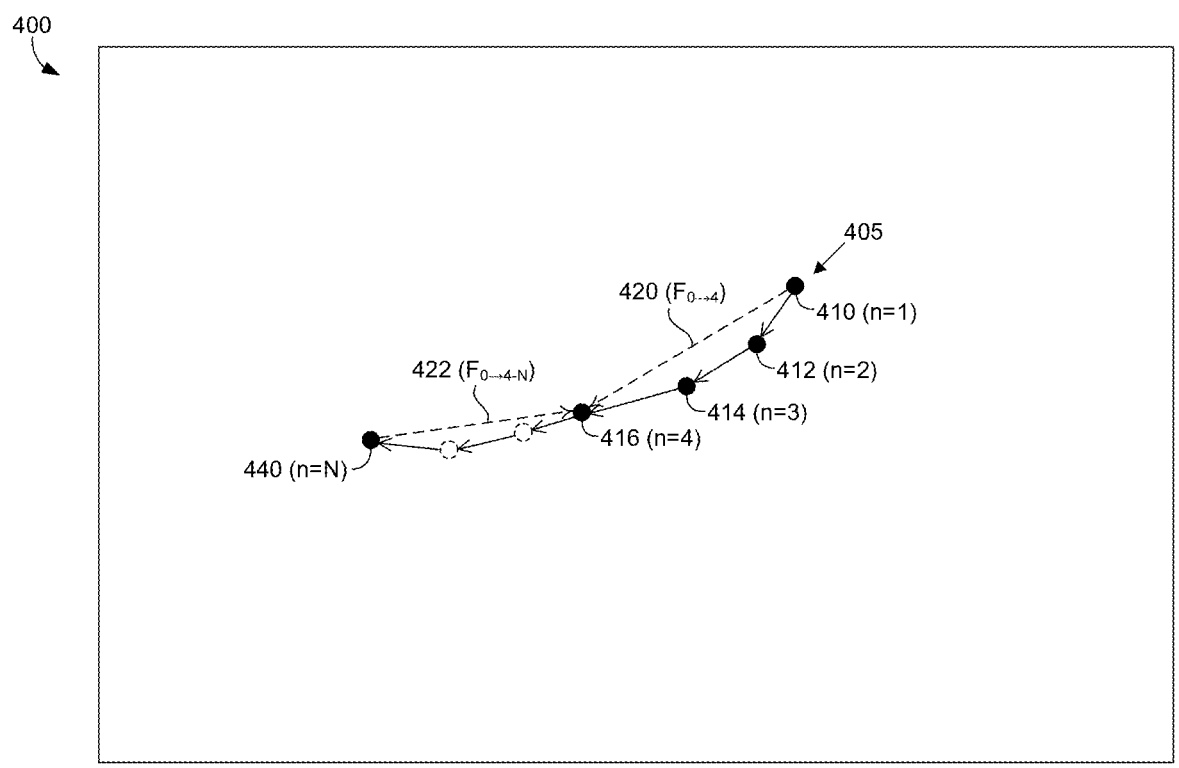
FIG. 4 is a diagram illustrating an example application of forward and reverse flow fields for generating animated frames, in accordance with embodiments of the present disclosure.

For example, referring to FIG. 4, the apparent motion of a pixel across a plurality of animated video frames is illustrated at 400. An example pixel 405 to be animated is shown at an initial starting position 410 which corresponds to its position in the initial still image 202 and defines frame n=1. At each subsequent video frame, the example pixel moves from position 410, to position 412 (frame n=2), to position 414 (frame n=3), to position 416 (frame n=4), as so forth until the pixel reaches a final position 440 in the final frame of the animated video (frame n=N). As illustrated in FIG. 2, each flow field pair 226 comprises a forward flow field $(F_{0{\rightarrow}t})$ 226-1 and a reverse flow field $(F_{0{\rightarrow}t-N})$ 226-2. For a given frame of animated video, n, the forward flow field indicates the displacement of a pixel in frame n relative to its initial starting position in frame n=1. For that same given frame of animated video, n, the reverse flow field indicates the displacement of pixel in frame n relative to its final position. Referring again to the example of FIG. 4, for frame n=4, the forward flow field $(F_{0{\rightarrow}4})$ shown at 420 indicates the displacement of the pixel 405 as it appears in frame n=4 with respect to its initial position at n=1. For the same frame n=4, the reverse flow field $(F_{0{\rightarrow}4-N})$ shown at 420 indicates the displacement of the pixel 405 as it appears in frame n=4 with respect to its initial position at n=1. The pair of flow fields, thus indicate how pixels belonging to fluid elements of the still image 202 are displaced with respect to the still image and projected into a frame of video associated with that pair of flow fields.

In some embodiments, to compute the flow field pairs 226 for each frame of animated video to be generated, the optical flow prediction pipeline 122 comprises the integration function 224. Eularian or Lagrangian integration is applied to $F_D^R$ 202 by integration function 224 for each of the n=0 to n=N frames of animated video to be generated from the initial still image 202. The result of the Euler integration is a set of N Eularian flow field pairs (shown at 226), each pair 226 comprising a forward flow field $(F_{0{\rightarrow}t})$ 226-1 and a reverse flow field $(F_{0{\rightarrow}t-N})$ 226-2. For example, to produce an animated video from still image 202 of 10 seconds in duration and comprising 30 frames-per-second (fps), integration function 224 will apply integration to the refined dense optical flow, $F_D^R$ 222 a total of 300 times to generate a set of 300 flow field pairs 226.

Although the flow fields 226 may be described as Eularian flow fields derived from Euler integration, it should be understood that the displacement of pixels may also be expressed via Lagrangian flow fields that are mathematically related to Eularian flow fields. As such, in alternate embodiments the flow field pairs 226 may comprise Eularian flow field computed using a Euler integration computation, or Lagrangian flow fields computed using an Lagrangian integration computation.

Figure 5:
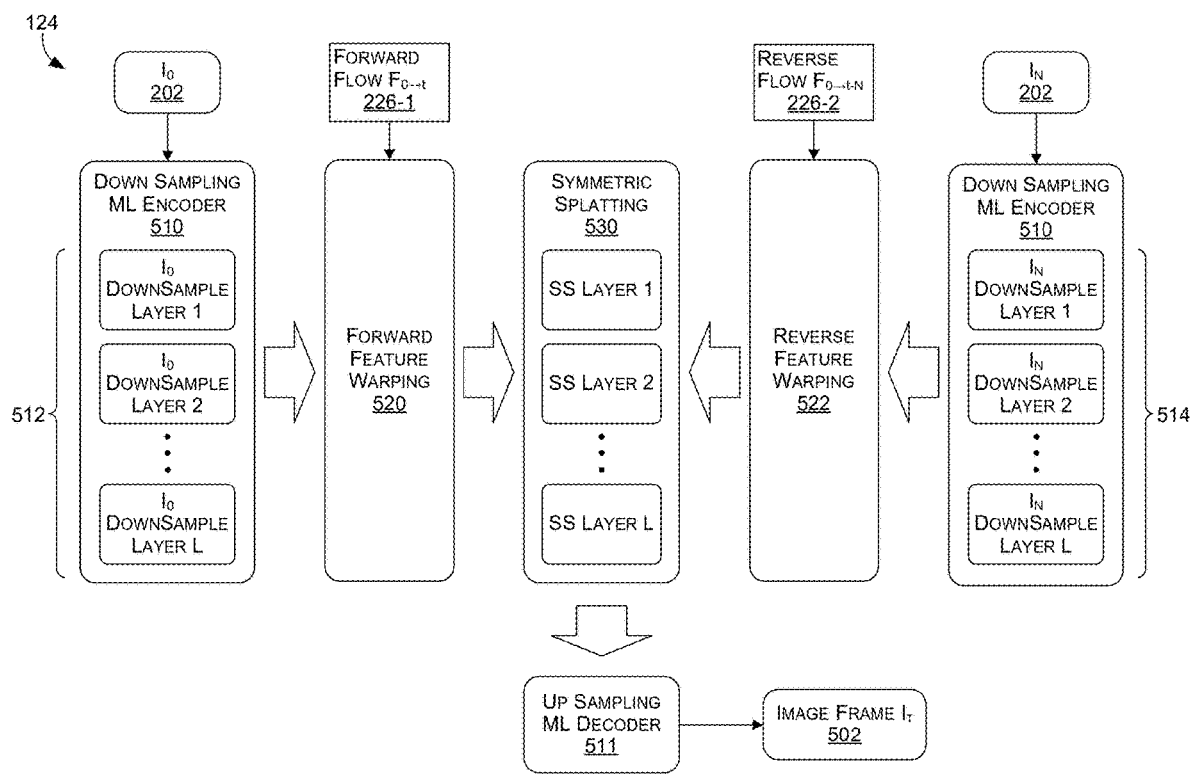
FIG. 5 is a diagram illustrating an example video frame generation pipeline, in accordance with embodiments of the present disclosure.

Referring now to FIG. 5, FIG. 5 is a diagram illustrating an example of a video frame generation pipeline 124, such as discussed with respect to FIG. 1. In this embodiment, the video frame generation pipeline 124 comprises an encoder-decoder machine learning model and is programmed to apply forward and reverse feature warping, and symmetric spatting, to generate a plurality video image frames.

In some embodiments, the encoder-decoder machine learning model comprises a down-sampling machine language encoder 510 and up-sampling machine language decoder 511 that are implemented using a U-net or other convolutional neural network architecture for semantic segmentation. The down-sampling machine learning encoder 510 receives the initial still image 202, and extracts image features at different resolutions (shown at 512 as layers 1 to L) from the initial still image 202. More specifically, the down-sampling machine learning encoder 510 extracts image features from the initial still image 202 at different resolutions to generate a plurality of first frame down-sample layers 512, each layer comprising a feature map corresponding to the still image 202 at a different resolution. In the same way, the down-sampling machine learning encoder 510 also extracts image features from the initial still image at different resolutions to generate a plurality of final frame down-sample layers (show at 514 as layers 1 to L), each layer comprising a feature map corresponding to the still image 202 at a different resolution. In other words, to produce each frame of animated video, the video frame generation pipeline 124 utilizes the initial still image 202 to define both the first frame ($I_0$) and the final frame (IN) of the animated video, and applies the flow field pairs 226 at each of the down-sampled layers to interpolate a video frame between those first and final frames. By utilizing the still image 202 to define both the first and final frames, the video frame generation pipeline 124 produces a length of animated video that appears as a continuous, smooth, and seamless, animated loop starting from and ending with the still image 202.

After extracting image features at different resolutions from the initial still image 202 the video frame generation pipeline 124 warps the features at each of the different resolutions based on the flow field pairs 226 to respectively produce a plurality of forward warped down sample layers (using Fort) and plurality of reverse warped down sample layers (using $F_{0 \to t-N}$) at each resolution. That is, instead of directly splatting (warping) the input still image 202 using the forward flow field 226-1 and reverse flow filed 226-2 to generate video frames (which might result in undefined pixels or "holes" in generated frames"), the video frame generation pipeline 124 performs forward and reverse feature warping on deep features of the image at different resolutions, which avoids the generation of undefined pixels.

Forward feature warping 520 is applied to each layer of the plurality of first frame down-sample layers 512 using the forward flow field, Fort, to produce a plurality of forward warped down sample layers. Reverse feature warping 522 is applied to each layer of the plurality of final frame down-sample layers 514 using the reverse flow field, $F_{0 \to t-N}$, to produce a plurality of reverse warped down sample layers. Each layer of the plurality of forward warped down sample layers correspond to a layer of the plurality of reverse warped down sample layers having the same resolution.

In some embodiments, forward feature warping 520 and reverse feature warping 522 are performed using a splatting method such as, but not limited to, softmax-spatting. Softmax-spatting uses softmax to scale the contribution of source pixels mapping to the same destination location, based on importance metric $Z \in \mathbb{R}^{H \times W \times 1}$. For example, for a given down-sampled layer of the input still image 202 at resolution a $D_0^r$, softmax-splatting output $D_t^r$ for a pixel at location, i, using a flow field (e.g. F0→t) can be generated by:

$$D_t^r(i) = \frac{\sum_{j \in X} D_0^r(i) e^{Z(j)}}{\sum_{j \in X} e^{Z(j)}}$$

where X consists of all the pixels that map to the same target location, I, after splatting. As shown at 530, the video frame generation pipeline 124 generates a plurality of symmetric splatting layers by applying symmetric splatting to the corresponding layers of the plurality of forward warped down sample layers and the plurality of reverse warped down sample layers. Thus, instead of just using softmax-splatting on deep features $D_0^r$ obtained from the still image 202 with forward flow field (F0→t) to generate $D_t^r$, video frame generation pipeline 124 uses a combination of the deep features $D_0^r$ from the first frame, $I_0$, and $D_N^r$ obtained from final frame, IN, splatted with $F_{0 \to t}$ and $F_{0 \to t-N}$ respectively. Specifically, any given pixel location, i, in the combined deep feature symmetric splatting layer $\hat{D}_t^r$ is given by:

$$\hat{D}_t^r(i) = \frac{\sum_{j \in X} D_t^r(i) e^{Z(j)} + \sum_{j \in \hat{X}} \hat{\alpha} D_{t-N}^r(i) e^{Z(j)}}{\sum_{j \in \hat{X}} \alpha e^{Z(j)} + \sum_{j \in \hat{X}} \hat{\alpha} e^{Z(j)}}$$

where α equals t/N and $\hat{\alpha}$ equals $$\left(1 - \frac{t}{N}\right),$$

$D_t^r(i)$ and $D_{t-N}^r(i)$ are feature maps obtained by softmax-splatting $D_0^r$, $D_N^r$, with $F_{0 \to t}$ and $F_{0 \to t-N}$ respectively, and X and g comprise of all the pixels that map to the same target location, i, after splatting for $D_t^r$ and $D_{t-N}^r$ respectively. The intuition behind using symmetric splatting is that any void regions appearing in the frames generated at time t by splatting the first image with $F_{0 \to t}$ is complementary to the void regions appearing in the frames generated by splatting the last image with $F_{0 \to N-t}$. The video frame 502 for the animated video is generated by the up-sampling machine learning encoder 512 of the encoder-decoder machine learning model from the plurality of symmetric splatting layers.

Figure 6A:
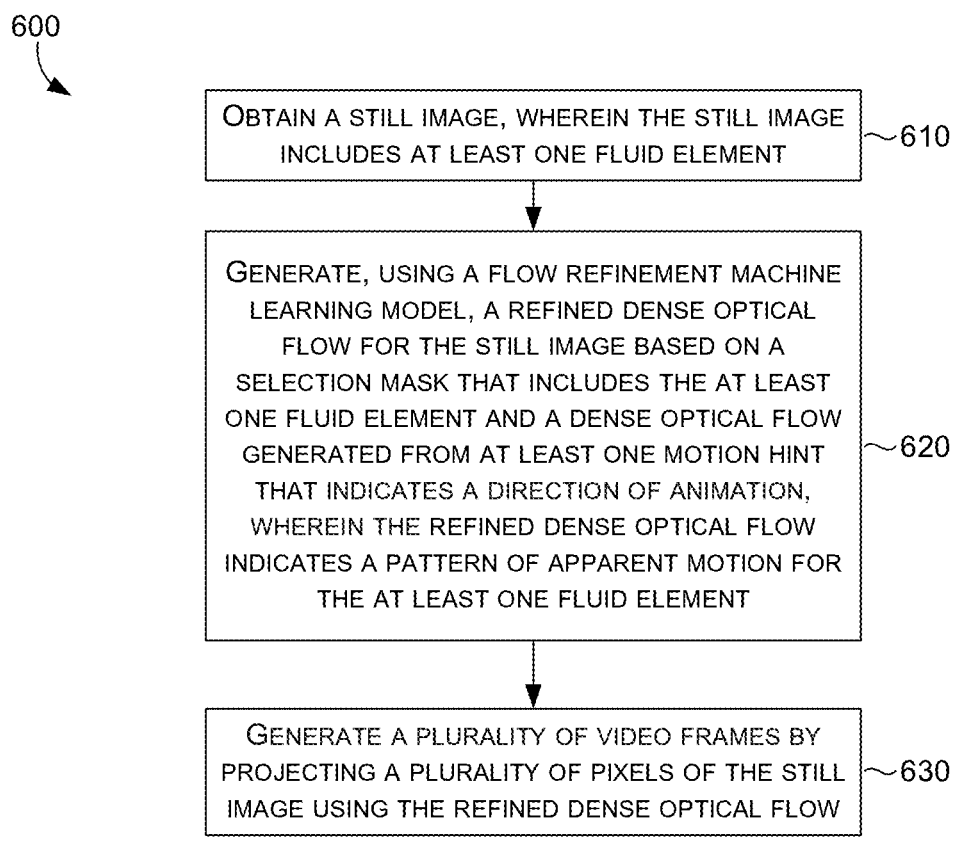
FIGS. 6A and 6B are flow charts illustrating example method embodiments for machine learning based animation of still images in accordance with embodiments of the present disclosure.
Figure 6B:
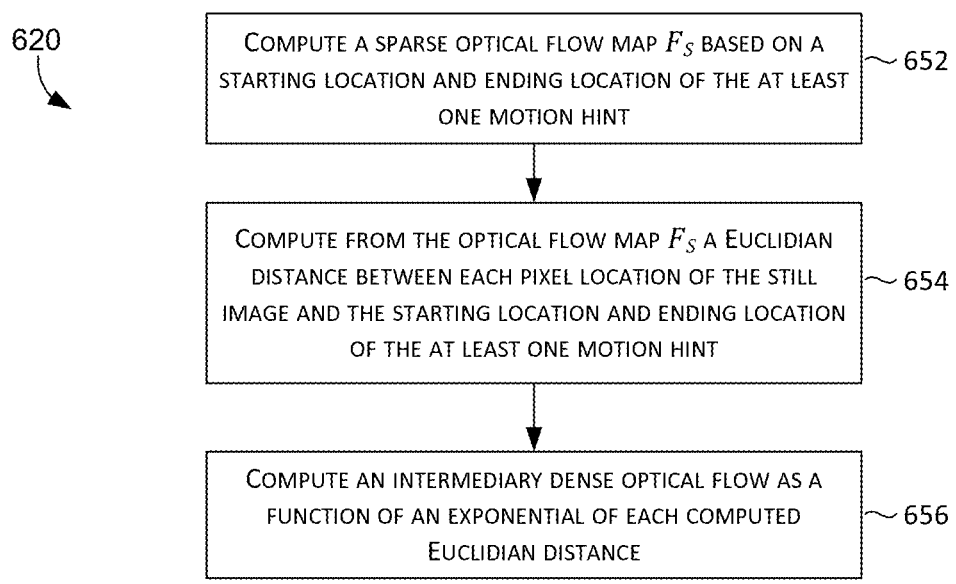

To further illustrate an example process, FIGS. 6A and 6B comprises a flow charts illustrating a method 600 for implementing machine learning based controllable animation of still images. It should be understood that the features and elements described herein with respect to the method 600 of FIGS. 6A and 6B can be used in conjunction with, in combination with, or substituted for elements of, any of the other embodiments discussed herein and vice versa. Further, it should be understood that the functions, structures, and other descriptions of elements for embodiments described in FIGS. 6A and 6B can apply to like or similarly named or described elements across any of the figures and/or embodiments described herein and vice versa. In some embodiments, elements of method 600 are implemented utilizing the image editing application 110 comprising the fluid animation function 120 disclosed above.

Method 600 begins at 610 with obtaining a still image, wherein the still image includes at least one fluid element. Fluid elements present in the still image may include, but are not limited to, water, smoke, fire and/or cloudy sky elements, or other elements that exhibit a fluid motion over time, for example. The method 600 proceeds to 620, which includes generating, using a flow refinement machine learning model, a refined dense optical flow for the still image based on a selection mask that includes the at least one fluid element and a dense optical flow (e.g., the intermediate dense optical flow) generated from at least one motion hint that indicates a direction of animation, wherein the refined dense optical flow indicates a pattern of apparent motion for the at least one fluid element. The machine learning model is trained to recognize fluid elements in natural scenes so that the refined dense optical flow comprises a realistic optical flow. In some embodiments, the at least one motion hint is based on a sparse optical flow generated from a user interaction with a display of the still image on a human machine interface. The motion hint can further comprises an indication of a speed of animation. For example, the user can draw motion hints or indicators (such as arrows) on a region of the still image comprising fluid elements to indicate a direction and speed of animation to be applied to the fluid elements. In some embodiments, an interactive user interface is displayed that allows the user to select and adjust the fluid element selection mesh, the motion hints and/or corresponding animation speeds, and/or select a number of frames of animated video to be generated. In some embodiments the flow refinement machine learning model comprises a Partially ADaptivE Normalization (SPADE) neural network or a generative-adversarial network (GAN).

In some embodiment, generation of the refined dense optical flow at 620 may be further defined as shown in FIG. 6B. More specifically, FIG. 6B illustrates a method for computing an approximation for the dense optical flow applied to flow refinement machine learning model from the at least one motion hint. At 652, the method includes computing a sparse optical flow map $F_S$ based on a starting location and ending location of the at least one motion hint. As discussed herein, the sparse optical flow map, $F_S$, may not itself provide adequate information for the machine learning model 220 to generate realistic optical dense flows for use in producing an animated video. The sparse input flow, $F_S$, is therefore converted to an intermediary dense optical flow, $F_D$. At 654, the method includes computing from the optical flow map $F_S$ a Euclidian distance between each pixel location of the still image and the starting location and ending location of the at least one motion hint. In some embodiments, the method computes the intermediary dense optical flow, $F_D$ as an L2 Euclidean distance, $D_{exp}$, between each pixel location in the input still image and the starting coordinate of each of the at least one motion hint. At 656, the method includes computing the intermediary dense optical flow as a function of an exponential of each computed Euclidian distance. The resulting intermediary dense optical flow, $F_D$, describes a motion of fluid elements of the still image, with the motion having a flow in approximately in the same direction across the still image. In some embodiments, this intermediary dense optical flow, $F_D$, is used at 620 as the dense optical flow input to the flow refinement machine learning model Returning to FIG. 6A, the method 600 proceeds to 630, which includes generating a plurality of video frames by projecting a plurality of pixels of the still image using the refined dense optical flow. In some embodiments, the plurality of video frames are generated by computing a plurality of flow field pairs from the refined dense optical flow. The plurality of flow field pairs each indicating a displacement of the plurality of pixels of the still image, each flow field pair comprising a forward flow field and a reverse flow field. The method then generates the plurality of video frames by projecting the plurality pixels of the still image based on a displacement indicated by the plurality of flow field pairs. In some embodiments, the plurality of video frames are produced using an encoder-decoder machine learning model to generate a video frame from a flow field pair, and generating an animated video based on an image frame sequence comprising the video frame generated from each of the plurality of flow field pairs. Using the flow field pairs, the encoder-decoder machine learning model applies deep feature warping and symmetric splatting to the still image to generate each of the N frames of animated video.

With respect to training, in some embodiments, the machine learning models of the optical flow prediction pipeline 122 and the video frame generation pipeline 124 are trained separately. The flow refinement machine learning model 220 is trained, in some embodiments, using generative adversarial network (GAN) loss and/or discriminator feature-matching loss. Such losses are computed based on refined dense optical flow 222 generated by the flow refinement model 220 during training. The encoder 510 and decoder 511 elements of the encoder-decoder machine learning model video for the frame generation pipeline 124 are trained, in some embodiments, using generative adversarial network (GAN) loss, visual geometry group (VGG) loss, an L1 loss, and/or discrimination feature-matching loss, for example. In some embodiments, training of the video frame generation pipeline 124 further comprises end-to-end fine-tuning. Contrary to run-time operations that produce a video from a single still image, the training samples comprise multi-frame video segments were distinct first and last frames of each training sample are used for symmetric-splatting and training of the video frame generation pipeline 124.

As discussed above, in addition to the input still image, during runtime operation, other user inputs further include a mask and motion hints. For purposes of training and testing, therefore, a substitute for a user generated mask and motion hint can be generated heuristically from a ground truth average optical flow. For example, with respect to mask generation, for every average optical flow map $F_{avg}$ in the training dataset, a mean-squared flow value can be calculated and any region of the input image having per-pixel squared-flow less than m times the mean-squared flow value is masked-out. The value of m, in some embodiments, may be on the order of m=10, for example. The value of in can be determined following observation on the visual quality of generated masks at different m values.

With respect to the flow related motion hint generation, using the M mask generated above, a masked average flow $F_{avg}^M$ can be calculated for each training sample video as M×$F_{avg}$, where $F_{avg}$ is the ground-truth average flow map for that video. In some embodiments k-means clustering may be performed for a number of iterations (e.g., for 100 iterations) on the individual $F_{avg}^M$, to find cluster centers based on a predetermine number of desired hint points for the input sparse optical flow map, $F_S$. The $F_S$ comprises values equal to the ground-truth average flow maps at the pixel location of cluster centers and zero elsewhere. As an example, the number of hints points can be chosen to be values such as 1, 3, or 5.

The embodiments present herein that utilize the flow refinement machine learning model to produce a refined dense optical flow are able to generate better flow maps for producing realistic animated videos from a single still image than possible from just using sparse hints with refinement network, in terms of peak signal-to-noise ratio (PSNR). While the intermediate dense optical flow $F_D$ discussed above is a good approximation of optical flow for many situations, the refined dense optical flow $F_D^R$ introduced by this disclosure corrects for regions representing inappropriate flows that appear in the intermediate dense optical flow map $F_D$. These corrections are directly reflected in the quality of the animation that is generated. A video generated using the intermediate dense optical flow can be expected to have artifacts, for example where the fluid motion of water down a waterfalls tends to shift progressively towards one direction, such as towards a lake receiving the waterfall appearing in the image. Such a shift is due to the fact that the intermediate dense optical flow would comprise the same flow values for the waterfall and the lake receiving the waterfall. In contrast, a video generated using the refined dense optical flow is very realistic and resembles the actual downward motion of waterfall observed in real-world videos without influence from the presence of the lake in the image.

Figure 7:
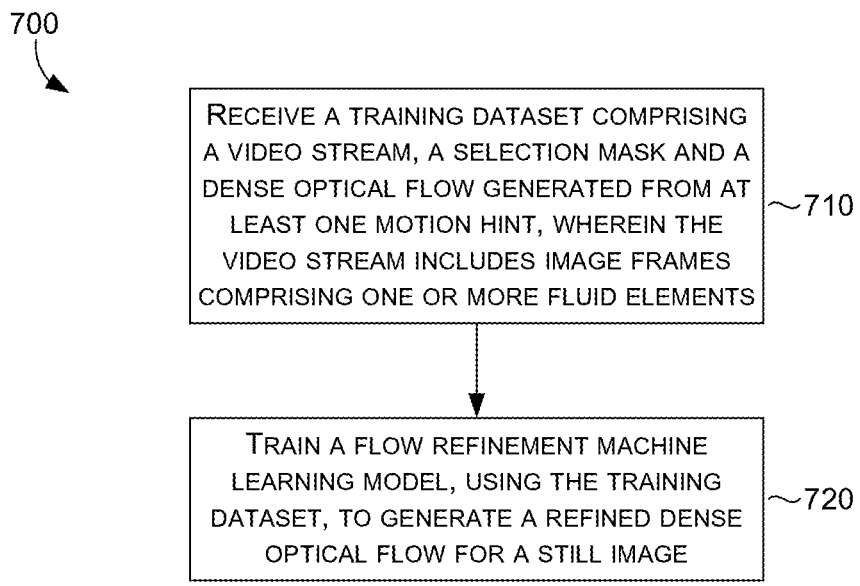
FIG. 7 is a flow chart illustrating an example method embodiment for training a machine learning model for animation of still images in accordance with embodiments of the present disclosure.

FIG. 7 comprises a flow chart illustrating a method 700 for training a flow refinement machine learning model. It should be understood that the features and elements described herein with respect to the method 700 of FIG. 7 can be used in conjunction with, in combination with, or substituted for elements of, any of the other embodiments discussed herein and vice versa. Further, it should be understood that the functions, structures, and other descriptions of elements for embodiments described in FIG. 7 can apply to like or similarly named or described elements across any of the figures and/or embodiments described herein and vice versa. In some embodiments, elements of method 700 are implemented utilizing the optical flow prediction pipeline 122 disclosed above, or other processing device.

Method 700 begins at 710 with receiving a training dataset comprising a video stream, a selection mask and a dense optical flow generated from at least one motion hint, wherein the video stream includes image frames comprising one or more fluid elements. For purposes of training and testing, a substitute for a user generated mask and motion hint can be generated heuristically from a ground truth average optical flow. In some embodiments, the training dataset can be obtained from a memory of the user device 102, received from a data store 106, or obtained from server 108. Method 700 proceeds to 720 with training a flow refinement machine learning model, using the training dataset, to generate a refined dense optical flow for a still image. The flow refinement machine learning model can comprise a neural network such as, but not limited to, a Partially ADaptivE Normalization (SPADE) neural network or a generative-adversarial network (GAN). In some embodiments, training the flow refinement machine learning model comprises using a generative adversarial network (GAN) loss and/or a discrimination feature-matching loss, that are computed from a generated refined dense optical flow. In some embodiments, the training may further comprise generating one or more flow field pairs from the refined dense optical flow. The plurality of flow field pairs each indicate a displacement of the plurality of pixels of the still image, and each flow field pair comprise a forward flow field and a reverse flow field. The training dataset and the one or more flow field pairs are used to training an encoder-decoder machine learning model to compute one or more video frames. For example, the encoder-decoder machine learning model, in some embodiments, is trained using a loss computed from a generated refined dense optical flow, the loss comprising at least one of a generative adversarial network (GAN) loss, a visual geometry group (VGG) loss, an L1 loss, and/or a discrimination feature-matching loss.

Figure 8:
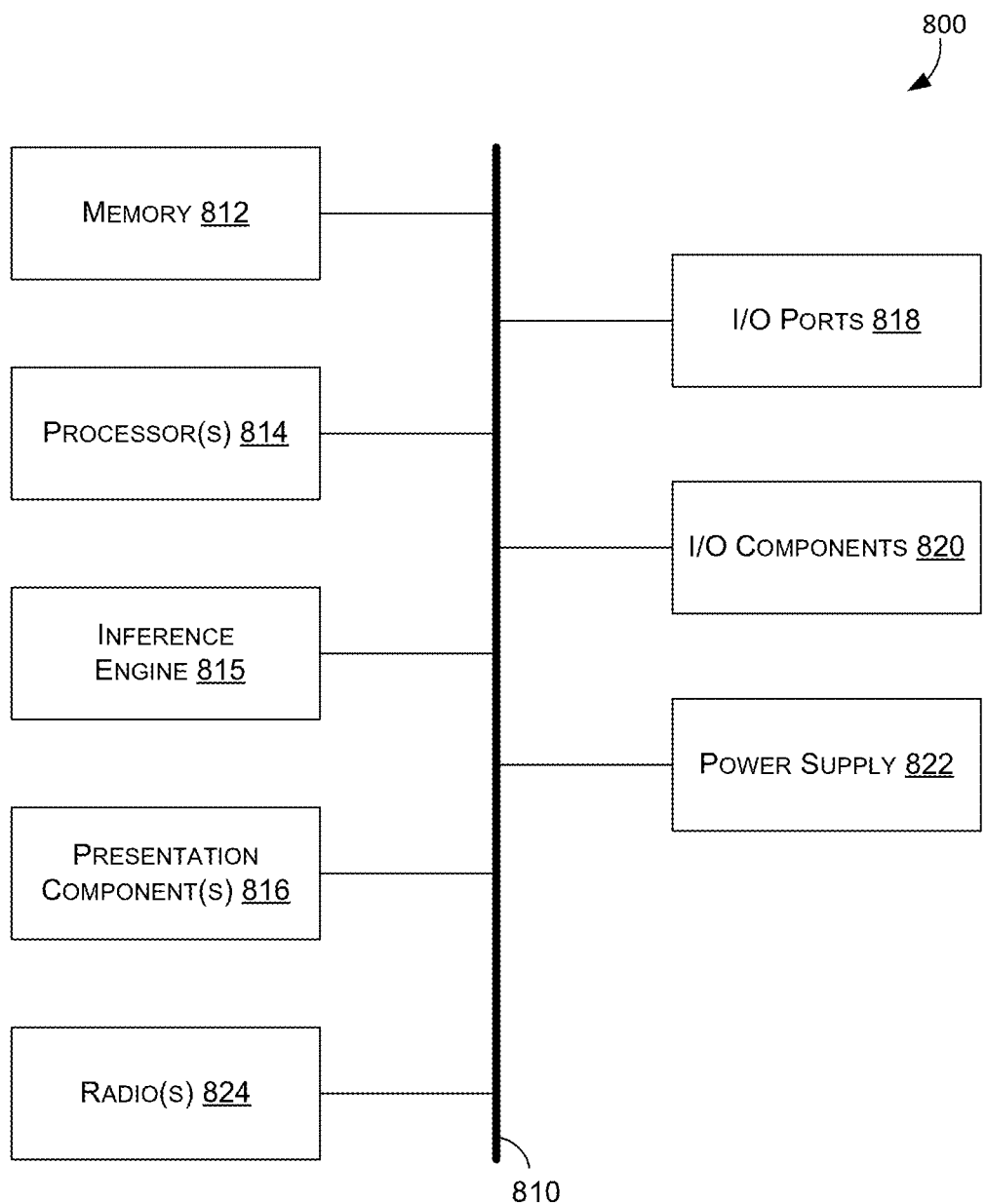
FIG. 8 is a diagram illustrating an example computing environment in accordance with embodiments of the present disclosure.

With regard to FIG. 8, one exemplary operating environment for implementing aspects of the technology described herein is shown and designated generally as computing device 800. Computing device 800 is just one example of a suitable computing environment and is not intended to suggest any limitation as to the scope of use or functionality of the technology described herein. Neither should the computing device 800 be interpreted as having any dependency or requirement relating to any one or combination of components illustrated.

The technology described herein can be described in the general context of computer code or machine-usable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein, including the optical flow prediction pipeline 122 and/or the video frame generation pipeline 124, can be practiced in a variety of system configurations, including handheld devices, consumer electronics, general-purpose computers, and specialty computing devices. Aspects of the technology described herein can also be practiced in distributed computing environments where tasks are performed by remote-processing devices that are linked through a communications network such as network 104.

With continued reference to FIG. 8, computing device 800 includes a bus 810 that directly or indirectly couples the following devices: memory 812, one or more processors 814, a neural network inference engine 815, one or more presentation components 816, input/output (I/O) ports 818, I/O components 820, an illustrative power supply 822, and a radio(s) 824. Bus 810 represents one or more busses (such as an address bus, data bus, or combination thereof). Although the various blocks of FIG. 8 are shown with lines for the sake of clarity, it should be understood that one or more of the functions of the components can be distributed between components. For example, a presentation component 816 such as a display device (e.g., which may be used to display user interface 302) can also be considered an I/O component 820. The diagram of FIG. 8 is merely illustrative of an exemplary computing device that can be used in connection with one or more aspects of the technology described herein. Distinction is not made between such categories as "workstation," "server," "laptop," "tablet," "smart phone" or "handheld device," as all are contemplated within the scope of FIG. 8 and refer to "computer" or "computing device."

Memory 812 includes non-transient computer storage media in the form of volatile and/or nonvolatile memory. The memory 812 can be removable, non-removable, or a combination thereof. Exemplary memory includes solid-state memory, hard drives, and optical-disc drives. Computing device 800 includes one or more processors 814 that read data from various entities such as bus 810, memory 812, or I/O components 820. Presentation component(s) 816 present data indications to a user or other device and in some embodiments, comprises s HMI display for presenting user interface 302. Neural network inference engine 815 comprises a neural network coprocessor, such as but not limited to a graphics processing unit (GPU), configured to execute a deep neural network (DNN) and/or machine learning models. In some embodiments, the fluid animation function 120 is implemented at least in part by the neural network inference engine 815. Exemplary presentation components 816 include a display device, speaker, printing component, and vibrating component. I/O port(s) 818 allow computing device 800 to be logically coupled to other devices including I/O components 820, some of which can be built in.

Illustrative I/O components include a microphone, joystick, game pad, satellite dish, scanner, printer, display device, wireless device, a controller (such as a keyboard, and a mouse), a natural user interface (NUI) (such as touch interaction, pen (or stylus) gesture, and gaze detection), and the like. In aspects, a pen digitizer (not shown) and accompanying input instrument (also not shown but which can include, by way of example only, a pen or a stylus) are provided in order to digitally capture freehand user input. The connection between the pen digitizer and processor(s) 814 can be direct or via a coupling utilizing a serial port, parallel port, and/or other interface and/or system bus known in the art. Furthermore, the digitizer input component can be a component separated from an output component such as a display device, or in some aspects, the usable input area of a digitizer can be coextensive with the display area of a display device, integrated with the display device, or can exist as a separate device overlaying or otherwise appended to a display device. Any and all such variations, and any combination thereof, are contemplated to be within the scope of aspects of the technology described herein.

A NUI processes air gestures, voice, or other physiological inputs generated by a user. Appropriate NUI inputs can be interpreted as ink strokes for presentation in association with the computing device 800. These requests can be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 800. The computing device 800, in some embodiments, is be equipped with depth cameras, such as stereoscopic camera systems, infrared camera systems, RGB camera systems, and combinations of these, for gesture detection and recognition. Additionally, the computing device 800, in some embodiments, is equipped with accelerometers or gyroscopes that enable detection of motion. The output of the accelerometers or gyroscopes can be provided to the display of the computing device 800 to render immersive augmented reality or virtual reality. A computing device, in some embodiments, includes radio(s) 824. The radio 824 transmits and receives radio communications. The computing device can be a wireless terminal adapted to receive communications and media over various wireless networks.

Figure 9:
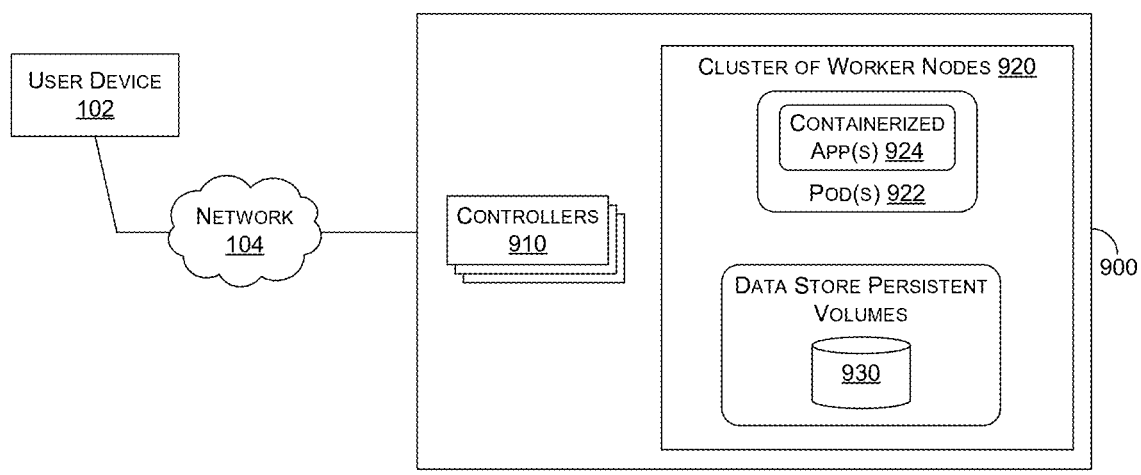
FIG. 9 is a diagram illustrating an example cloud based computing environment in accordance with embodiments of the present disclosure.

FIG. 9 is a diagram illustrating a cloud based computing environment 900 for implementing one or more aspects of the image editing application 110 or fluid animation function 120 discussed with respect to any of the embodiments discussed herein. Cloud based computing environment 900 comprises one or more controllers 910 that each comprises one or more processors and memory, each programmed to execute code to establish a cloud base computing platform executing at least part of the image editing application 110 or fluid animation function 120. In one embodiment, the one or more controllers 910 comprise server components of a data center. For example, in one embodiment the image editing application 110 and/or fluid animation function 120 are virtualized network services running on a cluster of worker nodes 920 established on the controllers 910. For example, the cluster of worker nodes 920 can include one or more of Kubernetes (K8s) pods 922 orchestrated onto the worker nodes 920 to realize one or more containerized applications 924 for the image editing application 110 and/or fluid animation function 120. In some embodiments, the user device 102 can be coupled to the controllers 910 by a network 104 (for example, a public network such as the Internet, a proprietary network, or a combination thereof). In such and embodiment, one or both of the image editing application 110 and/or fluid animation function 120 are at least partially implemented by the containerized applications 924. In some embodiments the cluster of worker nodes 920 includes one or more one or more data store persistent volumes 930 that implement the data store 106. In some embodiments video frames or animated image files generated by the image editing application 110 and/or fluid animation function 120 are saved to the data store persistent volumes 930 and/or ground truth data for training the fluid animation function 120 is received from the data store persistent volumes 930.

In various alternative embodiments, system and/or device elements, method steps, or example implementations described throughout this disclosure (such as the image editing application, fluid animation function, optical flow prediction pipeline, video frame generation pipeline, machine learning models, or any of the modules or sub-parts of any thereof, for example) can be implemented at least in part using one or more computer systems, field programmable gate arrays (FPGAs), application specific integrated circuits (ASICs) or similar devices comprising a processor coupled to a memory and executing code to realize that elements, processes, or examples, said code stored on a non-transient hardware data storage device. Therefore, other embodiments of the present disclosure can include elements comprising program instructions resident on computer readable media which when implemented by such computer systems, enable them to implement the embodiments described herein. As used herein, the terms "computer readable media" and "computer storage media" refer to tangible memory storage devices having non-transient physical forms and includes both volatile and nonvolatile, removable and non-removable media. Such non-transient physical forms can include computer memory devices, such as but not limited to: punch cards, magnetic disk or tape, or other magnetic storage devices, any optical data storage system, flash read only memory (ROM), non-volatile ROM, programmable ROM (PROM), erasable-programmable ROM (E-PROM), Electrically erasable programmable ROM (EEPROM), random access memory (RAM), CD-ROM, digital versatile disks (DVD), or any other form of permanent, semi-permanent, or temporary memory storage system of device having a physical, tangible form. By way of example, and not limitation, computer-readable media can comprise computer storage media and communication media. Computer storage media does not comprise a propagated data signal. Program instructions include, but are not limited to, computer executable instructions executed by computer system processors and hardware description languages such as Very High Speed Integrated Circuit (VHSIC) Hardware Description Language (VHDL).

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and can be employed without reference to other features and sub-combinations and are contemplated within the scope of the claims.

In the preceding detailed description, reference is made to the accompanying drawings which form a part hereof wherein like numerals designate like parts throughout, and in which is shown, by way of illustration, embodiments that can be practiced. It is to be understood that other embodiments can be utilized and structural or logical changes can be made without departing from the scope of the present disclosure. Therefore, the preceding detailed description is not to be taken in the limiting sense, and the scope of embodiments is defined by the appended claims and their equivalents.

What is claimed is:

1. A system comprising:
a memory component; and
one or more processing devices coupled to the memory component, the one or more processing devices to perform operations comprising:
obtaining a still image, wherein the still image includes at least one fluid element;
obtaining a selection mask that includes the at least one fluid element;
obtaining one or more motion hints indicating motion directions of the at least one fluid element of the still image;
generating, using an optical flow prediction pipeline and the motion directions of the one or more motion hints, a sparse optical flow map;
generating, using the optical flow prediction pipeline and the sparse optical flow map, an intermediary dense optical flow for the still image;
generating, using a flow refinement machine learning model, a refined dense optical flow from the intermediary dense optical flow, the still image, and the selection mask, wherein the refined dense optical flow is generated by refining the intermediary dense optical flow by the flow refinement machine learning model using the selection mask, the still image, and the one or more motion hints, and wherein the refined dense optical flow indicates a pattern of apparent motion for the at least one fluid element; and
generating a plurality of video frames by projecting a plurality of pixels of the still image using the refined dense optical flow.

2. The system of claim 1, the operations further comprising:
generating a plurality of flow field pairs from the refined dense optical flow, the plurality of flow field pairs each indicating a displacement of the plurality of pixels of the still image, each flow field pair comprising a forward flow field and a reverse flow field; and
generating the plurality of video frames by projecting the plurality of pixels of the still image based on the displacement indicated by the plurality of flow field pairs.

3. The system of claim 2, wherein each flow field pair of the plurality of flow field pairs comprises either a Eularian flow field pair or a Lagrangian flow field pair.

4. The system of claim 2, wherein for each video frame of the plurality of video frames, the operations further comprise:
projecting a displacement of pixels of the still image based on a respective flow field pair of the plurality of flow field pairs.

5. The system of claim 2, the operations further comprising:
generating, using an encoder-decoder machine learning model, a video frame of the plurality of video frames from a selected flow field pair of the plurality of flow field pairs; and
generating an animated video based on an image frame sequence comprising the video frame generated from each of the plurality of flow field pairs.

6. The system of claim 5, wherein the encoder-decoder machine learning model comprises a down sampling machine language encoder and an up sampling machine learning decoder.

7. The system of claim 6, the operations further comprising:
generating, with the down sampling machine language encoder, a first plurality of down sample layers from the still image, and warping the first plurality of down sample layers based on the forward flow field of a first flow field pair to generate a plurality of forward warped down sample layers;
generating, with the down sampling machine language encoder, a second plurality of down sample layers from the still image, and warping the second plurality of down sample layers based on the reverse flow field of the first flow field pair to generate a plurality of reverse warped down sample layers;
generating, a plurality of symmetric splatting layers by applying symmetric splatting to corresponding layers of the plurality of forward warped down sample layers and the plurality of reverse warped down sample layers; and
generating the video frame, with the up sampling machine learning decoder, based on the plurality of symmetric splatting layers.

8. The system of claim 5, wherein the encoder-decoder machine learning model is trained using a loss computed from a generated refined dense optical flow, the loss comprising at least one of a generative adversarial network (GAN) loss, a visual geometry group (VGG) loss, an L1 loss, and a discrimination feature-matching loss.

9. The system of claim 1, wherein the one or more motion hints are based on a sparse optical flow generated from a user interaction with a display of the still image on a human machine interface.

10. The system of claim 1, wherein the one or more motion hints further comprise an indication of a speed of animation.

11. The system of claim 1, wherein the flow refinement machine learning model comprises a Partially ADaptivE Normalization (SPADE) neural network or a generative-adversarial network (GAN).

12. The system of claim 1, wherein the flow refinement machine learning model is trained using a generative adversarial network (GAN) loss and a discrimination feature-matching loss computed from a generated refined dense optical flow.

13. A method comprising:
receiving a training dataset comprising a video stream, a selection mask and a dense optical flow generated from at least one motion hint, wherein the video stream includes image frames comprising one or more fluid elements and the selection mask includes the one or more fluid elements;
generating, using an optical flow prediction pipeline and motion directions of the at least one motion hint, a sparse optical flow map for the image frames;
generating, using the optical flow prediction pipeline and the sparse optical flow map, an intermediary dense optical flow for the image frames; and
training a flow refinement machine learning model, using the training dataset and the intermediary dense optical flow, to generate a refined dense optical flow for a still image, wherein the refined dense optical flow is generated by refining the intermediary dense optical flow by the flow refinement machine learning model using the selection mask, the still image, and the at least one motion hint, and wherein the refined dense optical flow indicates a pattern of apparent motion for the one or more one fluid elements.

14. The method of claim 13, wherein the flow refinement machine learning model comprises a Partially ADaptivE Normalization (SPADE) neural network or a generative-adversarial network (GAN).

15. The method of claim 13, the method further comprising:
training the flow refinement machine learning model using a generative adversarial network (GAN) loss and a discrimination feature-matching loss, computed from a generated refined dense optical flow.

16. The method of claim 13, the method further comprising:
generating one or more flow field pairs from the refined dense optical flow, the one or more flow field pairs each indicating a displacement of a plurality of pixels of the still image, each flow field pair comprising a forward flow field and a reverse flow field; and
training an encoder-decoder machine learning model, using the training dataset and the one or more flow field pairs, to compute one or more video frames.

17. The method of claim 16, wherein the encoder-decoder machine learning model is trained using a loss computed from a generated refined dense optical flow, the loss comprising at least one of a generative adversarial network (GAN) loss, a visual geometry group (VGG) loss, an L1 loss, and a discrimination feature-matching loss.

18. A non-transitory computer-readable medium storing executable instructions, which when executed by a processing device, cause the processing device to perform operations comprising:
receiving a still image;
receiving a selection mask for the still image that includes at least one fluid element of the still image and at least one motion hint that indicates a direction of animation of the at least one fluid element;
generating, using an optical flow prediction pipeline and the at least one motion hint that indicates a direction of animation of the at least one fluid element, a sparse optical flow map;
generating, using the optical flow prediction pipeline and the sparse optical flow map, an intermediary dense optical flow for the still image;
generating, using a flow refinement machine learning model, a refined dense optical flow from the intermediary dense optical flow, the still image, and the selection mask, wherein the refined dense optical flow is generated by refining the intermediary dense optical flow by the flow refinement machine learning model using the selection mask, the still image, and the at least one motion hint, and wherein the refined dense optical flow indicates a pattern of apparent motion for the at least one fluid element; and
generating, using an encoder-decoder machine learning model, a plurality of video frames by projecting a plurality of pixels of the still image based on the refined dense optical flow.

19. The non-transitory computer-readable medium of claim 18, the operations further comprising:
generating a plurality of flow field pairs from the refined dense optical flow, the plurality of flow field pairs each indicating a displacement of the plurality of pixels of the still image, each flow field pair comprising a forward flow field and a reverse flow field; and
generating, using the encoder-decoder machine learning model, the plurality of video frames by projecting the plurality of pixels of the still image based on the displacement indicated by the plurality of flow field pairs.

20. The non-transitory computer-readable medium of claim 19, wherein the encoder-decoder machine learning model comprises a down sampling machine language encoder and an up sampling machine learning decoder, the processing device further to perform operations comprising:
generating, with the down sampling machine language encoder, a first plurality of down sample layers from the still image, and warping the first plurality of down sample layers based on the forward flow field of a first flow field pair to generate a plurality of forward warped down sample layers;
generating, with the down sampling machine language encoder, a second plurality of down sample layers from the still image, and warping the second plurality of down sample layers based on the reverse flow field for the first flow field pair to generate a plurality of reverse warped down sample layers;
generating, a plurality of symmetric splatting layers by applying symmetric splatting to corresponding layers of the plurality of forward warped down sample layers and the plurality of reverse warped down sample layers; and
generating a video frame of the plurality of video frames, with the up sampling machine learning decoder, based on the plurality of symmetric splatting layers.

* * * * *